BEST AVAILABLE COPY

W. WALZ.
ELECTRIC CONTROLLER.
APPLICATION FILED FEB. 10, 1909.

944,525.

Patented Dec. 28, 1909.
3 SHEETS—SHEET 3.

Witnesses.

Inventor.
W. Walz
by E. J. Fetherstonhaugh
Atty.

UNITED STATES PATENT OFFICE.

WILLIAM WALZ, OF TORONTO, ONTARIO, CANADA.

ELECTRIC CONTROLLER.

944,525.   Specification of Letters Patent.   Patented Dec. 28, 1909.

Application filed February 10, 1909. Serial No. 477,089.

*To all whom it may concern:*

Be it known that I, WILLIAM WALZ, a subject of the King of Great Britain, and resident of the city of Toronto, county of York, Province of Ontario, in the Dominion of Canada, have invented certain new and useful Improvements in Electric Controllers, of which the following is a specification.

The invention relates to improvements in electric controllers, as described in the following specification and illustrated in the accompanying drawings that form part of the same.

The invention consists essentially in the novel formation and arrangement of parts, whereby in the arrangement of contacts and wiring any number of motors may be operated in parallel, and whereby certain novel constructional details lead to the above and result in an improved controller.

The objects of the invention are, to prevent further injury to a temporarily disabled motor, to materially increase the efficiency in operation, to effect a greater convenience in installation and repairs and generally to provide a controller to overcome the various difficulties incident to the starting and stopping of motor operated vehicles.

Like characters of reference indicate corresponding parts in each figure.

Referring to the drawings, 1 is the controller back rigidly secured to the base 2 and having the vertical slots 3 therethrough and the pairs of lugs 4 extending from the side edges.

5 are small eye bolts arranged in pairs and pivotally secured on the pins 6 extending through the lugs 4, said bolts having thumb-nuts threaded on their outer ends.

7 is the central rigid section of the back portion of the controller casing having the hole 8 therethrough mid-way of its height.

9 is a plate preferably of wood secured to the outside of the section 7 over the hole 8 and having a central hole 10 therethrough of smaller dimensions than the hole 8.

11 and 12 are the side sections of the back of the casing hinged to the central section 7 and having the forwardly extending flanges 13 and 14 and the slotted lugs 15 extending outwardly from said flanges, each of said lugs being arranged to receive one of each of the pairs of bolts 5.

16 is the curved front portion of the casing having the slotted lugs 17 extending outwardly from its side edges and arranged to receive the other of the pairs of bolts 5. The front and side sections of the back of the casing are thus held closed by the said bolts 5.

18 is the top of the casing suitably secured to the controller back 1 and closing in the compartments 19 and 20 formed within the said casing, said top having the journal orifices 21 and 22 therethrough.

23 are uprights of wood or other suitable insulating material secured in the compartment 19 between the back 1 and the central section 7 by the cap screws 24 extending through said section 7 and having a plurality of horizontal wire slots 25 therethrough arranged in a vertical row.

26 are strips of wood or other suitable insulating material inserted in the slots 3 in the back 1 and suitably secured to the said back and having a number of horizontally arranged holes 27 therethrough corresponding with the wire slots 25 in the uprights 23.

28 are strips of insulating material arranged within the compartment 19 and overlapping the edges of the slots 3 and having holes registering with the holes 27 in the strips 26.

29 are bolts extending through the holes 27 and having flanged heads 30 secured to the strips 26.

31 are terminals supported on the extending ends of the bolts 29 and clamped securely against the insulating strips 28 by the nuts 32, said terminals being formed to receive the ends of the wires entering the controller through the hole in the section 7 of the back of the casing.

33 are lugs projecting from the bolt heads 30 having suitable pivot holes therethrough.

34 are pins threaded into suitably threaded orifices in the bolt heads adjacent to the lugs 33 and projecting outwardly therefrom, said pins having the rigid butterfly heads 35 and the square portions 36 immediately to the inside of said heads.

37 are contact fingers having the slotted lever inner ends 38 extending over the squared portions 36, said fingers being pivotally secured to the lugs 33 and extending outwardly therefrom to their fork-shaped outer ends 39.

40 are the contact pieces of said fingers pivotally supported in said forked ends 39, said contact pieces being arc-shaped and having the rearwardly projecting tongues 41 extending into the openings 42 at the back of the said forked ends, said tongues limiting the movement of said contact pieces.

43 are spiral springs encircling the pins 34 and abutting the outer side of the bolt heads 30 and the slotted lever ends of the fingers 37, thus keeping a constant pressure on said ends and swinging the contact pieces of the said fingers into their contact positions.

The pins 34 are held from turning by the slotted lever ends of the fingers 37 but they may be adjusted as desired by swinging the said fingers outwardly against the spring pressure until the squared portion is free of the slot in the said lever end and when said squared portion is free, the pin may be adjusted in the threaded hole in the bolt head.

44 is the main controller roll carried on the spindle 45, said spindle being journaled in the orifice 21 in the top and in a suitable bearing in the bottom of the casing, said spindle extending above the top of the casing and operated by a key 46. The roll 44 is divided into top and bottom sections 47 and 48 joined by the metal cylinder 49, said metal cylinder inclosing the blow out coil 50, the latter encircling the spindle 45.

51 is a contact partially surrounding the roll 44 adjacent to the top end thereof above the metal cylinder 49 and connected to the blow out coil 50 by the wire 52, said contact 51 being engaged by the corresponding finger 37.

Figure 1:
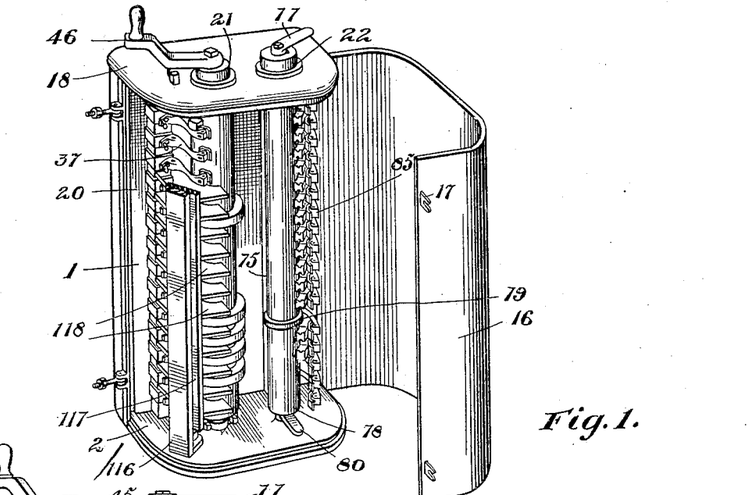
Figure 1 is a perspective view of the controller showing the cover in its open position.
Figure 2:
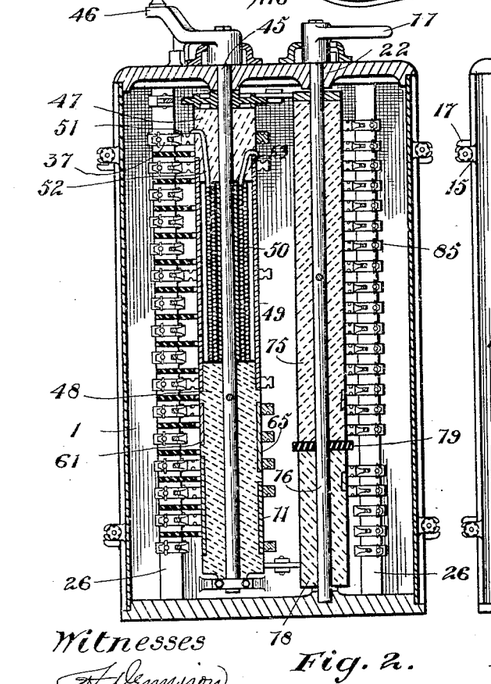
Fig. 2 is a vertical sectional view of the controller.
Figure 3:
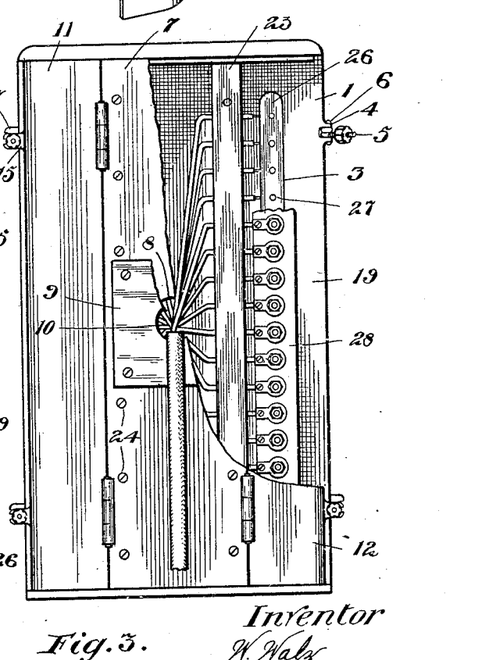
Fig. 3 is a rear elevation of the controller showing the cover partially broken away.
Figure 4:
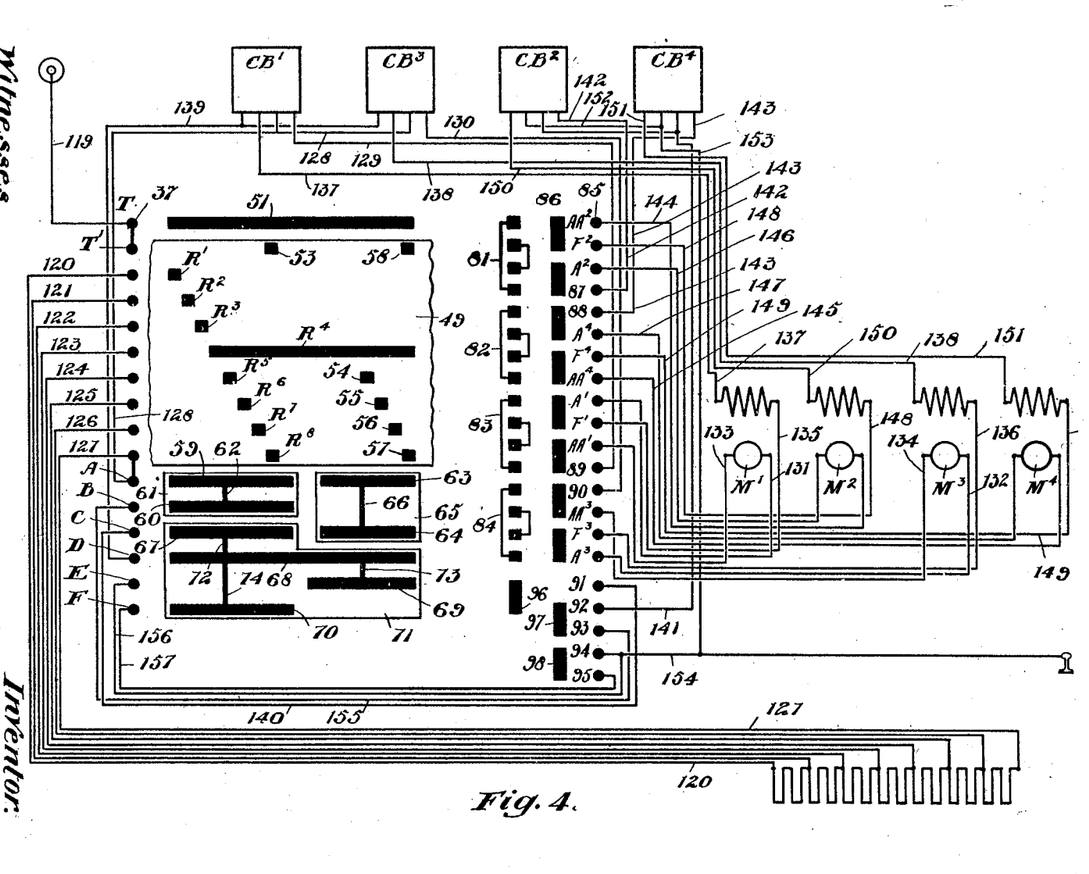
Fig. 4 is a diagrammatic view showing the plan of wiring in a motor operated vehicle and the connections to the controller.
Figure 5:
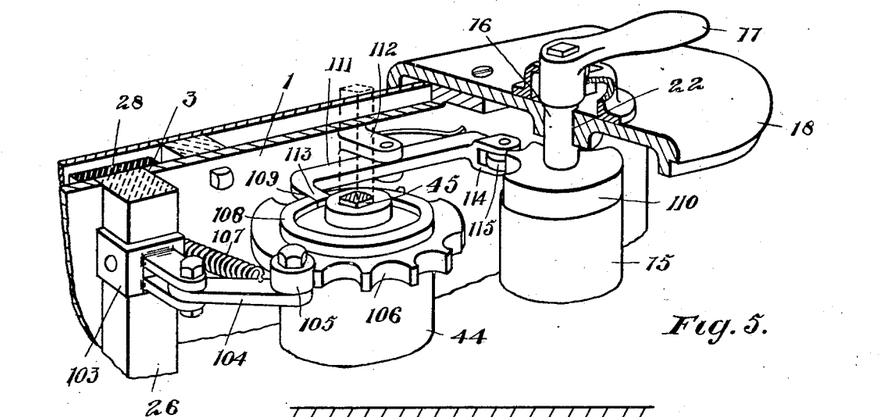
Fig. 5 is an enlarged sectional perspective detail of the lever connections and locking mechanism.
Figure 6:
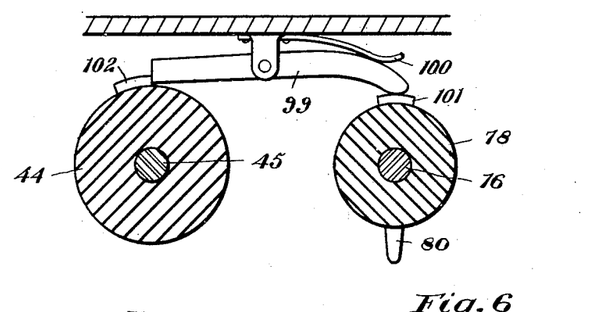
Fig. 6 is a cross sectional view through the roll shown in Fig. 5 showing the means for limiting the movement of said rolls.
Figure 7:
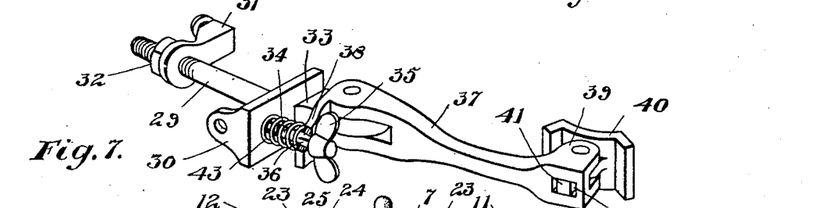
Fig. 7 is an enlarged perspective detail of a contact finger and contact.
Figure 8:
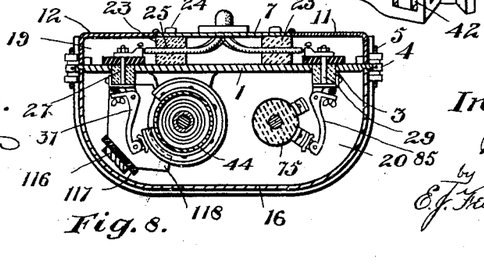
Fig. 8 is a cross sectional view of the controller through the line *a—b* Fig. 2.

On the brass cylinder 49 are mounted the contacts $R^1$, $R^2$, $R^3$, $R^4$, $R^5$, $R^6$, $R^7$ and $R^8$ in consecutive running position as clearly shown in the diagrammatic view in Fig. 4, said contacts co-acting with the fingers 37 on suitable wire connections and bringing the speed of the vehicle gradually up to the highest running position with the motors connected in series parallel.

As the vehicle reaches the highest speed with the motors in series, the contact 53 in vertical alinement with the contact $R^8$ is brought into contact with the finger 37 which here may be designated as $T^1$, said finger $T^1$ being electrically connected with the contact finger corresponding and co-acting with the contact 51, the latter finger for descriptive purposes being here designated as T, said finger T being electrically connected directly to the trolley feed. In this running position, that is to say, with the contacts 53 and $R^8$ in contact with their corresponding fingers and the motors in series parallel, the blow out coil 50 is cut out, thus preventing any over-heating in said blow out coil.

54, 55, 56 and 57 are contacts corresponding to the contacts $R^5$, $R^6$, $R^7$ and $R^8$ and having rheostat connections through their corresponding fingers and arranged to bring the motors gradually into parallel running position. The contact 58 in vertical alinement with the contact 57 on the metal cylinder 49 corresponds exactly in its function with the contact 53, thus the blow out coil is only in use while the controller is being turned.

59 and 60 are contacts mounted on the plate 61 immediately below the metal cylinder 49, said contacts 59 and 60 being bridged at 62.

The fingers 37 co-acting with the contacts 59 and 60 are here designated as fingers A and B.

63 and 64 are contacts mounted on the plate 65, the contact 63 being in horizontal alinement with the contact 59 and the contact 64 being in a co-acting position with the finger 37, which is here designated as contact finger C, said contacts 63 and 64 being bridged at 66.

67, 68, 69 and 70 are contacts mounted on the plate 71, said contacts 67, 68, 69 and 70 co-acting with the fingers 37 which are here designated as C. D. E. and F, the contact 67 being in horizontal alinement with the contact 64 and the contact 68 partially surrounding the roll. The contacts 67 and 68 are bridged at 72, the contacts 68 and 69 at 73 and the contacts 68 and 70 at 74.

75 is the reverse roll mounted on the spindle 76, and turning therewith, the said spindle being journaled in the orifice 22 in the top 18 of the casing and in a suitable bearing in the bottom of the casing and operated by the key 77 as customary.

78 is a roll loosely mounted on the spindle 76 below the reverse roll 75 and separated from said reverse roll by the insulating washer 79, and having contacts thereon and forming a switch. The roll 78 is held stationary in two different positions and may be moved to either of its positions by the lever 80 secured thereto.

81, 82, 83 and 84 are groups of contacts arranged on the reverse roll 75 as customary in controller construction, said groups each having four contacts electrically connected in inner and outer pairs and engaging the fingers 85 in different pairs.

86 are contacts co-acting with the fingers 85 for reversing the direction of travel of the vehicle. The fingers 85 are precisely of the same construction and arrangement to the fingers 37, though the connections are through the other strip 26, consequently making different connections. The fingers 85 for convenience of description are here designated as $A$ $A^2$, $F^2$, $A^2$ and 87 making contact with the group of contacts 81; 88, $A^4$, $F^4$ and $A$ $A^4$ making contact with the group of contacts 82; $A^1$, $F^1$, $A$ $A^1$ and 89 making contact with the group of contacts 83, and 90; $A$ $A^3$, $F^3$ and $A^3$, making contact with the group of contacts 84. 91, 92, 93, 94, and 95 are fingers co-acting with the contacts on the roll switch 78.

96 is a contact mounted on the roll 78 and co-acting with the fingers 91 and 92 in the ordinary running position, that is to say, with the motors in series parallel.

97 and 98 are contacts co-acting with the fingers 92, and 93 and 94 and 95 respectively, the said contacts 97 and 98 being adapted to arrange the connections in such a manner as to run any number of motors in parallel.

99 is a dog pivotally secured intermediate of its length to the controller back 1 toward the lower end thereof and having its rounded end spring held outwardly by the spring 100.

101 is a cam secured to the roll switch 78 here shown arranged diametrically opposite the lever 80 and engaging the rounded end of the dog 99 and pressing the said end inwardly against said spring, consequently tilting the opposite squared end of said dog outwardly.

102 is a stop secured to the lower end of the roll 44 in alinement with the squared end of the dog 99.

The cam 101 is so arranged on the roll switch 78 that when the contacts 97 and 98 are engaging their co-acting fingers the squared end of the dog 99 is moved so as to engage the stop 102 so that the main roll cannot be moved beyond the first running position, that is, with the contacts $R^s$ and 53 in contact with their corresponding fingers. In the ordinary running position the roll switch is turned so that the contact 96 is in engagement with the fingers 91 and 92, consequently the main roll may be turned to bring all of its contacts into operation.

103 is a bracket secured to one of the strips 26 near to the top end.

104 is a dog pivotally secured in the bracket 103 having a roller 105 journaled on the pin projecting upwardly from the end thereof.

106 is a ring secured to the top end of the main roll 44 and correspondingly notched to the contacts on the said roll, the roller 105 engaging said ring in said notches and spring held to the ring by the spring 107.

108 is a ring secured on the top of the main roll and having a notch 109 therethrough.

110 is a cam secured on the top of the reverse roll 75 and having suitable faces.

111 is an arm pivotally secured in the lugs 112 from the controller back 1 having a finger 113 at one end thereof adapted to extend into the notch 109 and at the other end having a jaw 114 in which the roller 115 is journaled, said arm being spring held with the roller engaging the faces of the cam 110 and said cam moving the finger 113 into the notch 109 for the purpose of locking said main roll when the reverse roll is turned to the "off" position.

116 is an upright metal bar secured to the bottom of the controller casing toward the front side thereof.

117 is a strip of insulating material covering the bar 116 at the inner side thereof.

118 are insulating plates extending inwardly from the strip 117 to the main roll 44 between the contacts arranged on said roll to prevent arcing therebetween.

The blow out coil 50 surrounding the spindle 45 magnetizes said spindle and also the controller back 1 and upright bar 116 which are preferably constructed of iron. The magnetizing of said spindle, back and upright forms a further preventative to arcing between the contacts and contact fingers.

$M^1$, $M^2$ $M^3$ and $M^4$ are the motors of the vehicle.

R is the rheostat.

$C$ $B^1$, $C$ $B^2$, $C$ $B^3$ and $C$ $B^4$ are circuit breakers, each having four connections and a double cut-out. The arrangement of the cut-outs is not explained herein as the construction of the circuit breakers forms a separate invention.

In the wiring plan 119 is a wire connecting the trolley to the contact finger T, the said finger T being bridged as explained with the contact fingers $T^1$.

120, 121, 122, 123, 124, 125, 126 and 127 are wires connecting the contact fingers co-acting with the contacts $R^1$ to $R^s$ respectively with the rheostat R in steps, the finger co-acting with the contact $R^s$ being bridged with the contact finger A as previously mentioned.

128 is a wire connecting the contact finger A with the circuit breakers $C$ $B^1$ and $C$ $B^3$ in multiple.

129 and 130 are wires connecting the circuit breakers $C$ $B^1$ and $C$ $B^3$ with the contact fingers 89 and 90 respectively.

131 and 132 are wires connecting the contact fingers $A^1$ and $A^3$ with the armatures of the motors $M^1$ and $M^3$ respectively.

133 and 134 are wires connecting the opposite brush of the armatures of the motors M¹ and M³ with the contact fingers A A¹ and A A³ respectively.

135 and 136 are wires connecting the contact fingers F¹ and F³ with the fields of the motors M¹ and M³ respectively.

137 and 138 are wires connecting the ends of the fields of said motors with the circuit breakers C B¹ and C B³ respectively.

139 is a wire connected in multiple to the wires 135 and 138 through the circuit breakers C B¹ and C B³ respectively and connecting said wires with the contact finger D of the main controller.

140 is a wire connecting the contact finger C with the contact finger 91.

141 is a wire connecting the contact finger 92 with the circuit breakers C B² and C B⁴ in multiple.

142 is a wire connected through the circuit breaker C B² with the wire 141 and to the contact finger 87.

143 is a wire connected through the circuit breaker C B⁴ with the wire 141 and to the contact finger 88.

144 and 145 are wires connecting the contact fingers A A² and A A⁴ with the armatures of the motors M² and M⁴ respectively.

146 and 147 are wires connecting the contact fingers of the armatures of the motors M² and M⁴ with the contact fingers A² and A⁴ respectively.

148 and 149 are wires connecting the contact fingers F² and F⁴ with the fields of the motors M² and M⁴ respectively.

150 and 151 are wires connecting the ends of the fields of the motors M² and M⁴ with the circuit breakers C B² and C B⁴ respectively.

152 and 153 are wires connected through the circuit breakers C B² and C B⁴ with the wires 150 and 151 respectively and connected in multiple with the contact finger 94 and through the wire 154 to the ground.

155 is a wire connecting the contact finger B with the contact finger 93.

156 is a wire connecting the contact finger E with the contact finger 94 and the ground wire 154.

157 is a wire connecting the contact finger F with the contact finger 95.

In the operation of this controller the current flowing from the trolley through the wire 119 reaches the contact 51 through the contact finger T on the turning of the main roll to the first position and from said contact the current flows through the blow out coil to the contact R¹ and through the corresponding contact finger to the wire 120, thus bringing in all of the resistance of the rheostat R. The current then flows from said rheostat through the wire 127 to the contact finger corresponding with the contact R³ and as said contact finger is bridged to the contact finger A, the current flows on through the wire 128 to the circuit breakers C B¹ and C B³, said circuit breakers being connected in multiple as explained. From the circuit breakers C B¹ and C B³ the current flows through the wires 129 and 130 to the contact fingers 89 and 90 and through said fingers reaching the groups of contacts 83 and 84 respectively. The outer of the contacts of each of said groups being electrically connected together conduct the current to the contact fingers A¹ and A³ respectively from whence the current flows through the wires 131 and 132 to the armatures of the motors M¹ and M³. The current then flows from the armatures of the said motors through the wires 133 and 134 to the contact fingers A A¹ and A A³ respectively. The inner pairs of contacts of the groups 83 and 84 making contact with the fingers A A¹ and A A³ carry the current to the contact fingers F¹ and F³ respectively. From the contact fingers F¹ and F³ the current flows through the wires 135 and 136 to the fields of the motors M¹ and M³ and from the fields through the wires 137 and 138 back to the circuit breakers C B¹ and C B³.

The wires 137 and 138 are connected in multiple with the wire 139 through said circuit breakers C B¹ and C B³ and the current is carried by said wire 139 to the contact finger D.

As the contact finger D is electrically connected with the contact 68 on the plate 71 the current flows through the bridge 72 and contact 67 to the contact finger C and from the contact finger C through the wire 140 to the contact finger 91.

The contact 96 in the ordinary running position makes an electrical connection between the contact fingers 91 and 92, thus the current flows from the contact finger 92 through the wire 141 to the circuit breakers C B² and C B⁴ in multiple and from said circuit breakers to the contact fingers 87 and 88 through the wires 142 and 143 respectively.

The contact fingers 87 and 88, being in contact with the groups of contacts 81 and 82 on the reverse roll, carry the current to the contact fingers A A² and A A⁴ from whence it flows through the wires 144 and 145 to the armatures of the motors M² and M⁴ respectively.

The return current from the motors M² and M⁴ is carried through the wires 146 and 147 to the contact fingers A² and A⁴ and flowing through the inner pairs of contacts of the groups 81 and 82 continues through the contact fingers F² and F⁴ through the wires 148 and 149 to the fields of the motors M² and M⁴. The current on passing through the fields of the motors M² and M⁴ flows through the wires 150 and 151 to the circuit breakers C B² and C B⁴ and through said circuit breakers to the wires 152 and 153 connected together in multiple and to the ground wire 154, thus the motors M¹ and M³ and the motors M² and M⁴ are arranged in series parallel connection. This connection is continued through the movement of the main roll 44 until the eighth position is reached, that is to say, with the contact R⁸ engaging the corresponding contact finger. In this position the current flows direct to the wire 128 without passing through the rheostat. Simultaneously with the cutting out of the resistance the contact finger T¹ engages the contact 53 and the current instead of flowing through the blow out coil then flows through the bridge connecting the fingers T and T¹. It will therefore be seen that as soon as the controller is moved to the running position the blow out coil is entirely cut out and consequently there will be no heating or loss of current.

On turning the main roll past the first running position, the contact R⁴ remains in contact with its corresponding finger and when the contact 54 is brought into contact with its corresponding contact finger the current flows through the wire 124 to the rheostat and returns through the wire 127 and as the contact finger corresponding to the contact R⁸ does not close any electrical connection the current flows through the bridge to the contact finger A and on through the wire 128 to the motors M¹ and M³ in the same manner as hereinbefore described.

The contact finger A engages the contact 63 on the plate 65 prior to the connection being established between the contact 54 and the wire 124 and when said finger A and contact 63 engage the current flows through the bridge 66 and contact 64 to the contact finger C, as well as through the wire 128 and from the contact finger C flows through the wire 140 to the contact finger 91, through the contact 96, contact finger 92, and wire 141 to the circuit breakers C B² and C B⁴ in multiple, thus feeding the motors M² and M⁴ direct from the trolley simultaneously with the motors M¹ and M³, thus bringing all four motors into parallel connection.

It will be seen that the motors are speeded up in four positions on the parallel circuits and as the contact finger R is out of contact the blow out coil is brought into service in the stepping up to the parallel running position, that is, with the contact 57 engaging the corresponding contact finger. In this position the finger T engages the contact 58 again cutting out the blow out coil.

In the event of any one of the motors being damaged through a short circuit or any other cause the operator of the car, after returning the main roll to zero, opens the front of the controller casing and turns the roll switch 78 to bring the contacts 97 and 98 into contact with the corresponding contact fingers. This does not affect the electrical circuits to the motors M¹ and M³ as their connection will be continued through the contact finger A and wire 128 as hereinbefore described, but an electrical connection is established between the contact fingers A and B through the contacts 59 and 60 connected by the bridge 62 and the current flows through the wire 155 to the contact finger 93, through the contact 97 and finger 92 and wire 141 in multiple to the circuit breakers C B² and C B⁴. The current flows from the circuit breakers C B² and C B⁴ through the connections hereinbefore described to the ground wire 154. On turning the roll switch 78 to connect all the motors in multiple the dog 99 is operated to limit the movement of the main roll 44 as previously described. As the said dog 99 does not allow the contact 69 to engage the contact finger E the return current from the motors M¹ and M³ flows from the contact 68 through the bridge 74, contact 70, finger F, wire 157, finger 95, contact 98, and finger 94 to the ground wire 154. It will thus be seen that the motors 1 and 3 and 2 and 4 are fed in multiple parallel circuits and as the connection from each motor is carried through an independent circuit breaker any accident occurring to any one of the motors will break the electrical connection in its corresponding circuit breaker and cut it out.

Each of the circuit breakers is provided with a double cut out, that is to say, on the operation of the said circuit breaker the wires leading thereto and therefrom are electrically disconnected, therefore there will be no possibility of a leak of current from the other circuits through the circuit of the damaged motor.

In the arrangement of the circuits herein described all of the motors of the vehicle may be run in parallel and if any one of said motors becomes disabled the circuit breaker for the disabled motor is automatically cut out.

If the roll switch is in the ordinary running position, that is, with the contact 96 engaging the contact fingers 91 and 92 either of the pairs of circuit breakers connected together in multiple may be cut out and break the circuits to the corresponding pair of motors. Immediately on this occurring the operator of the vehicle returns the circuit breakers to normal and then moves the roll switch to its second position bringing the contacts 97 and 98 into operation and cutting out the contact 96. With the contacts arranged in this manner, as soon as the main roll 44 is moved to its first position the individual circuit breaker corresponding with the damaged motor automatically cuts out the connection to said motor, therefore the operator does not require to have any knowledge of the numerous combinations of connections in order to run his car. It will thus be seen that any three of the motors in a four motor car may be operated in direct parallel connection if one motor is damaged instead of having to cut out a pair of motors as is the case with the ordinary series parallel motor controller.

The novel feature of the construction of the controller casing and the arrangement of the wiring therein is very important. The various wires are secured in a permanent position in the uprights 23 and if desired the main portion of the controller may be removed without disarrangement of the wires, it being simply necessary to remove the cap screws extending through said uprights and disconnect the back 1 from the base and the wires from the terminals, access being had to said terminals by swinging the side sections 11 and 12 outwardly on their hinges. This arrangement not only allows the main roll and the contact fingers to be removed *en bloc*, but allows the ready access to any of the parts, so that repairs may be very easily and quickly made.

All of the electrical connections are contained within the controlled casing and a great saving of time in making repairs is effected.

The novel construction of the contact fingers allows a very wide range of adjustment as the pins 34 may be adjusted in or out as far as desired. The contact pieces swinging in the forked ends of the contact fingers adjust themselves to the contacts on the controller roll and always maintain a perfect contact with a considerable area of contact surface. The projecting tongues extending from the back of the contact pieces prevent their swinging too far.

In arranging the blow out coil in the interior of the main roll great economy of space is effected and the said roll may be made of considerably greater diameter than any of the present forms of controllers. This allows a much greater number of contacts for rheostat positions.

The placing of the blow out coil within the controller roll localizes the magnetism in such a way that arcing between the contacts is entirely eliminated.

What I claim as my invention is:

1. In an electric controller, the combination with a plurality of motors, of a plurality of circuit breakers each electrically connected individually with one of said motors and electrically connected together in series parallel and to an electric current supply, means for controlling the flow of current to said circuit breakers, and means independent of said controlling means for connecting all of said circuit breakers and their corresponding motors in parallel.

2. In an electric controller, a plurality of circuit breakers electrically connected to an electric current supply, a plurality of motors electrically connected individually to said circuit breakers, means interposed between said circuit breakers and the current supply for controlling the flow of current to said circuit breakers and motors, and means independent of said controlling means interposed between said circuit breakers for changing the electrical connections of all of said circuit breakers to parallel.

3. In an electric controller, the combination with a plurality of motors and an electric current supply, of a plurality of stationary contacts, a plurality of co-acting movable contacts, a plurality of circuit breakers individual respectively to said motors, wiring connecting a pair of said circuit breakers in multiple, wiring connecting a pair of said motors individually in series with said pair of circuit breakers through certain of said co-acting contacts, wiring connecting another pair of said circuit breakers in multiple to the return from the aforesaid pair of circuit breakers otherwise in series parallel, wiring connecting the latter pair of circuit breakers to another pair of motors individually in series, and means independent of said controlling means interposed in the wiring between said pair of circuit breakers for instantaneously connecting all of said motors in parallel.

4. In an electric controller, the combination with a plurality of motors and an electric current supply, of a plurality of stationary contacts, a plurality of co-acting movable contacts, a plurality of circuit breakers individual respectively to said motors, wiring connecting a pair of said circuit breakers in multiple, wiring connecting a pair of said motors individually in series with said pair of circuit breakers through certain of said co-acting contacts, a second pair of circuit breakers connected in multiple, wiring connecting the second pair of circuit breakers with a second pair of motors individually in series, a switch having a single contact co-acting with stationary contacts electrically connected to the return wire from the first pair of circuit breakers and to the lead to the second pair of circuit breakers and connecting all of said circuit breakers in series parallel, said switch also having a pair of contacts co-acting with two other pairs of stationary contacts, wiring connecting a pair of the latter stationary contacts with the electric current supply and with the latter pair of circuit breakers, and wiring connecting the other pair of said latter stationary contacts with the return from the first pair of circuit breakers and with the ground.

5. In an electric controller, the combination with a plurality of motors and an electric current supply, of a casing, a main roll rotatably mounted in said casing, a succession of contacts mounted on said main roll, a plurality of contacts mounted on said main roll in addition to said succession of contacts, a plurality of contact fingers supported from said casing and establishing an electrical connection between said succession of contacts and said additional contacts, a resistance, wiring from certain of said contact fingers to said resistance, a plurality of circuit breakers, wiring from certain of said contact fingers to said circuit breakers, a reverse roll, a plurality of contacts in groups on said reverse roll having pairs in each group electrically connected, a plurality of contact fingers supported from said casing and co-acting with the contacts on said reverse roll, a roll switch suitably supported in said casing, a single contact on said roll switch, a pair of contacts on said roll switch, a plurality of contact fingers supported from said casing and co-acting with the contacts on said roll switch, wiring from certain of said reverse roll contact fingers to said circuit breakers, wiring from other of said reverse roll contact fingers to said motors, wiring from said motors to said circuit breakers, wiring from certain of said roll switch contact fingers to said circuit breakers and to the ground, wiring from other of said roll switch contact fingers to the contact fingers co-acting with the additional contacts on said main roll including a ground wire, and a main electrical conductor connected to certain of said main roll contact fingers and leading from said electric current supply.

6. In an electric controller, the combination with a plurality of motors and an electric current supply, of a casing, a main roll rotatably mounted in said casing, a contact extending partially around said roll, a pair of contact fingers supported from said casing and electrically bridged and connected to said electric current supply the upper of said fingers engaging said contact, a succession of contacts mounted on said main roll in steps and electrically connected together, one of said succession of contacts being elongated and extending partially around said roll, a plurality of contacts in successive steps mounted on said roll below said elongated contact and arranged in circumferential alinement with the contacts in the first succession, said latter contacts being electrically connected to the former succession, single contacts arranged in longitudinal alinement with the last of each of said sets of contacts and electrically connected therewith and co-acting with the second of said pair of contact fingers, a blow out coil carried on said main roll and surrounding the spindle thereof having one terminal electrically connected to the first mentioned contact on said roll and its other terminal electrically connected to the remaining of the before-mentioned contacts on said roll, a resistance, a plurality of contact fingers electrically connected to said resistance and co-acting with said successive contacts, a contact finger bridged to the last of the aforesaid contact fingers, a plurality of circuit breakers in corresponding numbers to said motors, wiring connecting certain of said circuit breakers to the latter bridged contact finger in multiple, a plurality of contacts on said main roll insulated from the aforesaid contacts, a plurality of contact fingers co-acting with the latter contacts, a roll switch suitably journaled in said casing, a single contact mounted on said roll switch, a pair of contacts mounted on said roll switch, contact fingers co-acting with said contacts on said roll switch, wiring connecting certain of the contact fingers co-acting with the insulated contacts on said main roll with certain of the contact fingers co-acting with the contacts on said roll switch and with a ground wire, wiring connecting one of said contact fingers co-acting with said single contact on said roll switch with other of said circuit breakers in multiple, a reverse roll, contacts on said reverse roll, contact fingers co-acting with the contacts on said reverse roll, wiring connecting certain of said reverse roll contact fingers with said circuit breakers, wiring connecting other of said reverse roll fingers with said motors, and wiring connecting certain of said circuit breakers with a ground wire.

7. In an electric controller, the combination with a plurality of motors and an electric current supply, of a casing, a main roll rotatably mounted in said casing, a succession of contacts mounted on said roll, a contact finger electrically connected with the electric current supply and co-acting with one of said succession of contacts, a resistance, a plurality of contact fingers connected with said resistance and co-acting with the remainder of said succession of contacts, a contact finger bridged to the last one of the fingers co-acting with the succession of contacts, a pair of contacts mounted on said main roll and electrically connected together and insulated from the aforesaid contacts, one of said pair of contacts co-acting with said bridged contact finger, a pair of contacts insulated from the aforesaid contacts mounted on said roll and electrically connected together, one of said contacts being arranged in circumferential alinement with the first of the aforesaid pair and the other being out of alinement with the second of the aforesaid pair, a plurality of contacts mounted on said main roll and electrically connected together and insulated from the aforesaid contacts, the first one being arranged in circumferential alinement with the second one of the second pair the second one of the latter set extending around the roll the full length of the first one and to the full length of the second one of the second pair, the third one being arranged substantially in longitudinal alinement with the second one of the second pair and the last one being arranged in longitudinal alinement with the first one and of substantially the same length, a contact finger co-acting with the second of the first pair of contacts, a contact finger co-acting with the first of the third set of contacts and the second of the second pair in succession, a contact finger co-acting with the second of the third set of contacts, a contact finger co-acting with the third of the third set of contacts, and a contact finger co-acting with the last of the third set of contacts, a roll switch suitably mounted in said casing, a single contact mounted on said roll switch, a pair of contacts mounted on said roll switch, a contact finger co-acting with said single contact and electrically connected with the finger co-acting with the first of the third set of contacts on the main roll, a contact finger co-acting with the first of the pair of contacts on said roll switch and electrically connected with the contact finger co-acting with the second of the first pair of contacts on the main roll, a contact finger co-acting with the second contact on said roll switch and electrically connected with the contact finger co-acting with the third contact of the third set of contacts on the main roll, a contact finger co-acting with the second contact on the roll switch and electrically connected with the contact finger co-acting with the last contact of the third set of contacts on the main roll, a pair of circuit breakers, a wire connecting said pair of circuit breakers in multiple with the contact fingers co-acting with the first of the first pair of separated contacts on the main roll, a wire connecting said pair of circuit breakers in multiple with the contact finger co-acting with the second of the third set of insulated contacts on the main roll, a second pair of circuit breakers, a wire connecting said second pair of circuit breakers in multiple with a contact finger co-acting with the first of the pair of contacts on the said roll switch, a wire connecting said circuit breakers in multiple with the contact finger co-acting with the second of the pair of contacts on the said roll switch and to a ground wire, a reverse roll, a plurality of contacts on said reverse roll arranged in groups and wired in pairs in each group, contact fingers co-acting with said contacts on said reverse roll, wiring connecting certain of the contact fingers of said reverse roll with said circuit breakers, wiring connecting the armatures of said motors to certain of said fingers of said reverse roll, wiring connecting one end of the fields of the said motors with said reverse roll fingers, and wiring connecting the other ends of the fields of said motors with said circuit breakers.

8. In an electric controller, a base, a back secured to said base and having vertical slots therethrough, a central rigid plate secured to said base behind said back and having an opening therethrough, side sections hinged to said central plate having forwardly extending flanges, a front plate secured to said back, a top covering the top of said front, back and side plates, strips of insulating material arranged between said rigid central plate and said back and having a plurality of horizontal wire slots therethrough, strips of insulating material secured in the vertical slots in said back, terminals secured to the latter strips, contact fingers secured in the latter strips and connected to said terminals, a main roll journaled in suitable bearings, and a reverse roll journaled in said suitable bearings.

9. In an electric controller, a casing, a main roll, a reverse roll, a pair of insulating strips in said casing, a plurality of bolts secured in said strips having lugs projecting from the heads thereof and pivot holes in said lugs, a plurality of contact fingers pivotally supported on said lugs and having slotted lever inner ends and fork-shaped outer ends and openings at the back of said forked ends, pins threaded in threaded orifices in said bolt heads and having squared portions fitting in the slots in the lever ends of said fingers and fixed heads, spiral springs encircling the said pins and holding said lever ends outwardly against the heads of said pins, and arc-shaped contact pieces pivotally secured in the forked ends of said contact fingers and having tongues projecting into the openings in the back of said fingers.

10. In an electric controller, a casing, a spindle mounted in suitable bearings in said casing, a roll of non-conducting material mounted on said spindle, a cylindrical metal casing secured to said roll and forming a chamber around said spindle, a cylindrical cap of non-conducting material mounted on said spindle and closing the top of said chamber, a blow out coil encircling said spindle and inclosed within said chamber, said coil being electrically connected at one end to said metal casing, a contact secured to said cylindrical cap and electrically connected to the other end of said magnet coil, a plurality of contacts secured to said metal casing, a contact finger electrically connected with an electric current supply and co-acting with the contact secured to said cap, a plurality of contact fingers adapted to co-act with the contacts on said metal cylinder, a plurality of electric motors, and wiring electrically connecting the latter contact fingers with said motors.

11. In an electric controller, the combination with a plurality of motors and a suitable rheostat, of a main roll suitable journaled and having a plurality of contact points arranged in steps thereon and electrically connected together, a plurality of stationary contacts electrically connected to said motors through said rheostat and adapted to co-act with the contacts on said main roll to feed the current to said motors in series parallel arrangement, and means operated independently of said main roll and interposed between said rheostat and said motors and adapted to change the electrical connections from all of the step up contacts on said main roll instantaneously to parallel connection prior to the turning of said main roll.

Signed at the city of Toronto, county of York, Province of Ontario, in the Dominion of Canada, this seventh day of January, 1909.

WILLIAM WALZ.

Witnesses:
A. DENNISON,
E. HERON.